United States Patent [19]

Rall

[11] 4,316,135
[45] Feb. 16, 1982

[54] CIRCUIT ARRANGEMENT FOR FEEDING MODULES IN USER STATIONS

[75] Inventor: Bernhard Rall, Ulm, Fed. Rep. of Germany

[73] Assignee: Licentia Patent-Verwaltungs-G.m.b.H., Frankfurt am Main, Fed. Rep. of Germany

[21] Appl. No.: 175,852

[22] Filed: Aug. 6, 1980

[30] Foreign Application Priority Data

Aug. 7, 1979 [DE] Fed. Rep. of Germany ....... 2931922

[51] Int. Cl.$^3$ .............................................. G05F 1/46
[52] U.S. Cl. ................................... 323/265; 323/276
[58] Field of Search ............... 323/220, 223, 224, 227, 323/228, 265, 271, 276, 282, 291, 312, 317

[56] References Cited

U.S. PATENT DOCUMENTS

| | | | |
|---|---|---|---|
| 3,079,543 | 2/1963 | Decker | 323/276 |
| 3,182,246 | 5/1965 | Lloyd | 323/276 |
| 3,531,712 | 9/1970 | Cecchini | 323/224 |

FOREIGN PATENT DOCUMENTS

| | | |
|---|---|---|
| 2043611 | 3/1972 | Fed. Rep. of Germany . |
| 2604935 | 8/1977 | Fed. Rep. of Germany . |

*Primary Examiner*—William M. Shoop
*Attorney, Agent, or Firm*—Spencer & Kaye

[57] ABSTRACT

A circuit arrangement for feeding a module requiring a constant operating voltage in a user station fed by a current-conducting connection path, composed of: components defining a current control unit connected for controlling the current in the connection path; components defining a resistance control unit connected for controlling the alternating current resistance presented by the circuit arrangement to the connection path; a first current conducting branch connected for feeding current supplied by the connection path to the module; a second current conducting branch connected for conducting current supplied by the connection path in a manner to bypass the module; and a signal responsive switch connected for establishing current flow between the connection path and a selected one of the branches.

3 Claims, 4 Drawing Figures

CIRCUIT ARRANGEMENT FOR FEEDING MODULES IN USER STATIONS

BACKGROUND OF THE INVENTION

The present invention relates to a circuit arrangement for feeding a component which requires a constant operating voltage in user stations that are fed by a connection line.

User stations, or terminals, of telegraph and telephone systems are fed through user connection lines, hereinafter referred to as connection lines. The end instruments then receive their current supply, for example, from a 60 V office battery via a choke coil or a relay winding having a winding resistance of the order of 1 k $\Omega$. Depending on the length of the user connection line, whose ohmic resistance may be as high as 2.5 k $\Omega$, there will be loop currents, in the case of a short circuit, of between 17 and 60 mA.

Superposed on the loop current is the voice current or possibly a low frequency signal current. For this current, the end instrument should have an alternating current resistance of, e.g. 600 $\Omega$.

In the future, more and more functions of the end instruments, such as, for example, dial signal emission, will be performed by integrated circuits, or modules. In order to operate these with as little losses in power as possible and to have a sufficient safety margin against the maximum permissible operating voltage for the modules, it desirable to have as low an operating voltage as possible at the connecting terminals of the user instrument. On the other hand, occasionally occurring high amplitudes in the audio signals which are superposed on the direct current, must be transmitted without distortion.

If, for example, a module is designed for an operating voltage of 3 V and the maximum amplitude in the alternating voltage to be expected is 2.8 V, it is necessary to have, without an additional alternating current choice in the user instrument or without additional circuit measures, a terminal voltage of at least 3 V + 2.8 V = 5.8 V, there then existing a further problem, however, in the realization of a linear 600 $\Omega$ a.c. resistance.

SUMMARY OF THE INVENTION

It is an object of the present invention to overcome the above-mentioned difficulties.

A more specific object of the invention is to provide a novel circuit arrangement which has a linear a.c. resistance below the operating voltage of the module and causes no distortion in the alternating current superposed on the loop current.

These and other objects are achieved, according to the invention, by a circuit arrangement for feeding a module containing a component requiring a constant operating voltage in a user station fed by a current-conducting connection path, which arrangement includes: current control means connected for controlling the current in the connection path; resistance control means connected for controlling the alternating current resistance presented by the circuit arrangement to the connection path; means defining a first current conducting branch connected for feeding current supplied by the connection path to the module; means defining a second current conducting branch connected for conducting current supplied by the connection in a manner to bypass the module; and signal responsive switching means connected for establishing current flow between the connection path and a selected one of the branches.

A circuit arrangement according to the invention can operate at a terminal voltage of 5.5 V and with superposed audio signal voltages with an amplitude of 3 V without distoring the signal voltages, and can provide a stabilized direct voltage of 3 V for a module component. In the stated fluctuation range of the loop current the a.c. resistance of the circuit arrangement stays constant and can be set separately, for example to a value of 600 $\Omega$.

DESCRIPTION OF THE PREFERRED EMBODIMENTS

Figure 1:
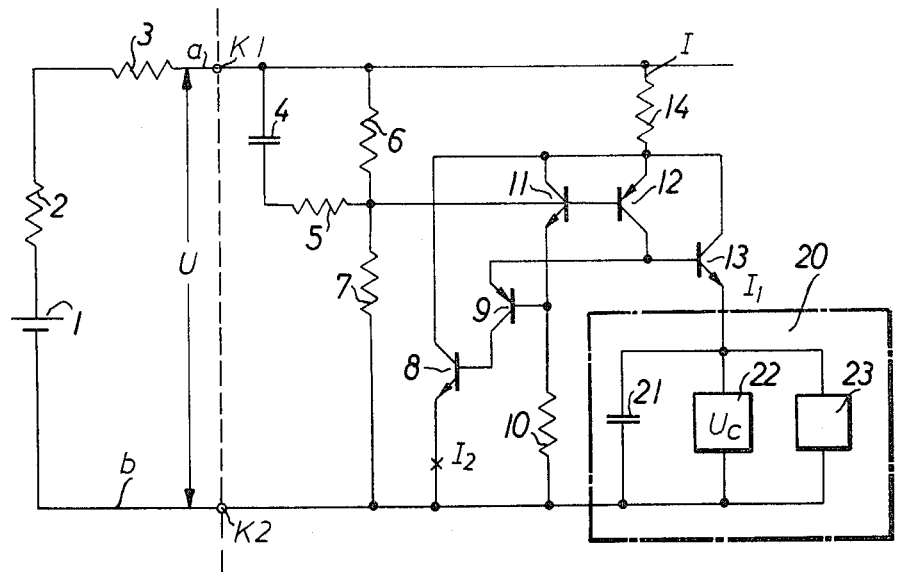
FIG. 1 is a circuit diagram of a preferred embodiment of a circuit arrangement according to the invention.

FIG. 1 shows the circuit diagram for a preferred embodiment of a circuit according to the invention. A user device having terminals K1 and K2 is connected to the conductors a and b defining a connection path, or line, whose line resistance is represented by a resistor 3, and is fed by a 60 V battery at a central office via the d.c. resistance 2 of a choke or relay coil, having a value of 1 k$\Omega$. The circuit arrangement according to the invention, which is incorporated into the user device, includes the components 4 through 14 and is connected with a module 20 composed of a component 23 requiring a constant operating voltage, and a constant voltage circuit 22, in the simplest case a Zener diode, to which a capacitor 21 is connected in parallel, circuit 22 and capacitor 21 acting to maintain the required constant operating voltage across component 23.

The circuit arrangement according to the invention is provided with a first circuit measure which determines the loop current in the connection line and which is of a type disclosed in FRG-OS No. 2,043,611. It is essentially composed of a transistor 12 of a first conductivity type, in the illustrated embodiment of pnp type, provided with an emitter resistor 14 and having its base connected to a base voltage divider which includes resistors 6 and 7 and is connected between the two connecting terminals K1 and K2. The emitter resistor 14 has its free end connected to terminal K1. As can be seen, this circuit is an emitter current stabilized transistor stage in common emitter connection with a feedback connected resistor in the emitter lead.

As long as the magnitude of the collector-emitter voltage of transistor 12 remains greater than 0 V, the emitter current of this circuit is proportional to the terminal voltage between the terminals K1 and K2 so that, measured between terminals K1 and K2, it constitutes a fixed ohmic resistance.

The collector-base path of a complementary transistor 13 of the second conductivity type, i.e., of npn type, is connected in parallel with the emitter-collector path of transistor 12. This transistor 13 forms together with the transistor 12 a complementary Darlington circuit so that the collector current of transistor 12 controls the transistor 13 to the extent that practically all of the current through the resistor 14 is provided by transistor 13 and the control current for transistor 12 is less by the current amplification factors of transistors 12 and 13.

The emitter of transistor 13 is connected to the module 20 to be fed and thus also to the capacitor 21 and the consistent voltage circuit 22 whose respective other terminals are connected to terminal K2.

Between terminals K1 and K2, the above-described circuit, with shorted resistor 5, presents an a.c. resistance which lies above the desired value of, for example 600 Ω. Therefore, a second measure is provided which reduces the a.c. resistance of the circuit arrangement to the desired value. This includes the series connection of a resistor 5 to capacitor 4. This series connection is connected in parallel with the base voltage divider resistor 6. Resistor 5 permits an additional portion of the alternating loop voltage to act on the transistor 12 via its base. The lower the resistance value selected for resistor 5, the greater is the a.c. resistance of the circuit arrangement. Consequently, the desired resistance value can be set by selection of resistor 5.

If, however, the voltage between the emitter of the transistor 12 and terminal K2, which lies about 0.3 to 1 V below the voltage between terminals K1 and K2, drops to below the voltage across the capacitor 21, transistor 13 will be blocked without any further circuit measures, the a.c. resistance of the circuit arrangement becomes undefined and the alternating current superposed on the loop current will be distorted.

Therefore, according to a further feature of the invention, the circuit includes means for providing not only a first current for feeding the module 20 but also additionally a second circuit for conducting the loop current away from module 20.

This second current is established by an arrangement composed of three transistors 8, 9 and 11. The first transistor 8 is of the npn type and has its emitter-collector path connected between the emitter of transistor 12 and the terminal K2 of the connecting line in such a way that its emitter is connected to terminal K2. The second 9 transistor is of the pnp type and has its emitter-collector path connected between the collector of the transistor 12 and the base of transistor 8 in such a manner that its collector is connected to the base of transistor 8. The third transistor 11 is again of the npn type. Its emitter-collector path is connected between the base of transistor 9 and the emitter of transistor 12 in such a way that its collector is connected with the emitter of transistor 12. The base of transistor 9 is additionally connected, via a resistor 10, the terminal K2 of the connecting line and the base of transistor 11 is connected to the base of transistor 12.

The transistor 11 is controlled via the base-emitter path of the transistor 12 and via the base-emitter paths of transistors 9 and 13, by the voltage difference between the emitter voltage of transistor 12 and the voltage across the capacitor 21. If this voltage difference becomes too small, transistor 13 is blocked and the transistors 9 and 8 which had previously been blocked by transistor 11 are now controlled to be conductive by the voltage across resistor 10.

Figure 2:
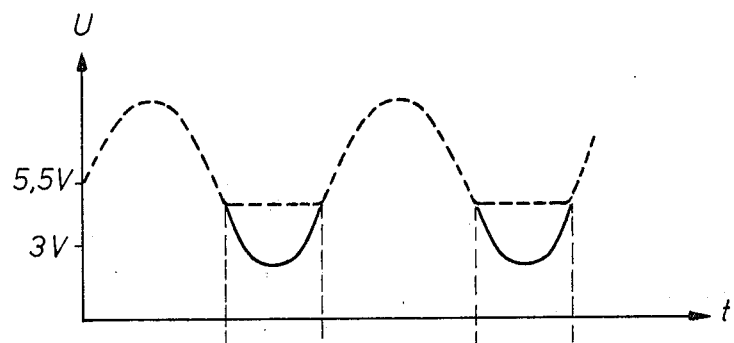
FIG. 2 is a signal diagram illustrating the time waveform of an assumed terminal voltage in the circuit of FIG. 2.

FIG. 2 shows the curve of a sinusoidal audio frequency signal between terminals K1 and K2 of the connecting line when a voltage of 3 V is presented across capacitor 21. The voltage generated by the direct loop current across terminals K1 and K2 is assumed to be, for example, 5.5 V. The amplitude of the superposed alternating voltage is assumed to be 3 V.

If no current is drawn off via transistor 8, there results the curve shown in dashed lines. It shows that the voltage becomes flat below 4.5 V and the alternating voltage signal is thus distorted, resulting in undesirable distortion of the audio transmission which is associated with considerable changes in the a.c. resistance of the circuit arrangement. By conducting loop current away via transistor 8, this flattening is avoided.

Figure 3:
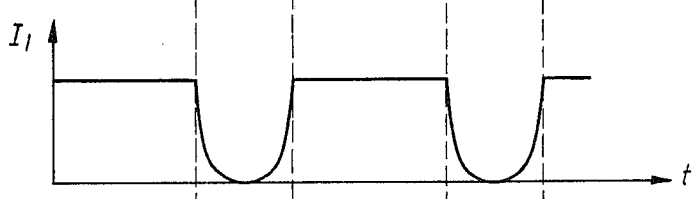
FIG. 3 is a diagram of the time waveform of the supply current $I_1$ into the circuit 20 of FIG. 1.
Figure 4:
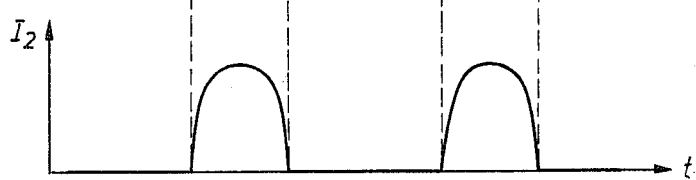
FIG. 4 is a diagram of the time waveform of the current $I_2$ bypassing circuit 20 of FIG. 1.

FIG. 3 shows the path of the supply current $I_1$ flowing through the emitter of transistor 13 and FIG. 4 shows the path of the second current $I_2$ deflected from module 23 and which essentially flows through the collector-emitter path of transistor 8. If the terminal voltage U between points K1 and K2 drops to below 4.5 V, transistor 13 becomes nonconductive so that supply current $I_1$ ceases to flow and the loop current between K1 and K2 is taken over in the desired manner by transistor 8 as deflected current $I_2$. During the short time in which the supply current I is interrupted, it is the task of capacitor 21 to furnish the module supply current.

The circuit arrangement according to the invention moves the starting point of a.c. voltage distortions toward lower terminal voltages so that with a maximum loop current of 100 mA and an average terminal voltage value of 5.5 V, the power loss of the circuit arrangement is only 550 mW. However, without the circuit arrangement according to the invention and with the then required average terminal voltage of about 8.5 V, the power loss would be 850 mW, so that it would then be necessary already to provide expensive cooling measure. An average terminal voltage of 8.5 V with a superposed alternating voltage amplitude of 3 V would result in peak voltages of 11.5 V, which would give rise to technical difficulties relating to the integrated circuit. In the circuit arrangement according to the invention, however, the maximum peak voltage lies below 10 V and thus in a safe range.

It is to be understood that the above description of the present invention is susceptible to various modifications, changes and adaptations, and the same are intended to be comprehended within the meaning and range of equivalents of the appended claims.

What is claimed is:

1. A circuit arrangement for feeding a module containing a component requiring a constant operating voltage in a user station fed by a current-conducting connection path, comprising: current control means connected for controlling the current in said connection path; resistance control means connected for controlling the alternating current resistance presented by said circuit arrangement to said connection path; means defining a first current conducting branch connected for feeding current supplied by said connection path to said module; and means defining a second current conducting branch connected for conducting current supplied by said connection path in a manner to bypass said module only when the voltage between two selected points in said connection path falls below the constant operating voltage required by the module.

2. Circuit arrangement as defined in claim 1 wherein: said connection path presents two terminals between which flows the current in said connection path; said current control means comprise a first transistor of one conductivity type having a feedback-connected emitter, an emitter resistor connected between said emitter of said first transistor and one of said terminals, a voltage divider connected between said two terminals and having a tap connected to the base of said first transistor, and a second transistor of the opposite conductivity type having its collector-base path connected in parallel with the collector-emitter path of said first transistor to form with said first transistor a complementary Darlington circuit, with the emitter of said second transistor being arranged to be connected to the module;

said resistance control means comprise a resistor and a capacitor connected together in series between said one terminal and said voltage divider tap;

said means defining a first current conducting branch includes said Darlington circuit; and said means defining a second current conducting branch comprise a third transistor of said opposite conductivity type having its emitter-collector path connected between the emitter of said first transistor and the other one of said terminals, a fourth transistor of said one conductivity type having its emitter-collector path connected between the base of said third transistor and the collector of said first transistor, a fifth transistor of said opposite conductivity type having its emitter-collector path connected between the emitter of said first transistor and the base of said fourth transistor and having its base connected to the base of said first transistor, and a second resistor connected between the base of said fourth transistor and said one of said terminals.

3. Circuit arrangement as defined in claim 1 wherein said means defining a second current conducting branch comprise voltage responsive switching means connected for controlling the conductive state of the second branch.

* * * * *